(12) United States Patent
Nicolas et al.

(10) Patent No.: US 7,857,499 B2
(45) Date of Patent: Dec. 28, 2010

(54) METHOD AND DEVICE FOR HOMOGENIZING AND FILTERING A VISCOELASTIC MATERIAL USING COAXIAL TELESCOPING SCREWS

(75) Inventors: Serge Nicolas, Clermont-Ferrand (FR); Gérard Crosnier, Ceyrat (FR); Bruno Dussardier, Ennezat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 762 days.

(21) Appl. No.: 11/898,215

(22) Filed: Sep. 10, 2007

(65) Prior Publication Data

US 2008/0068919 A1    Mar. 20, 2008

(30) Foreign Application Priority Data

Sep. 14, 2006    (FR)    .................... 06 08124

(51) Int. Cl.
    *B29B 7/46*    (2006.01)
(52) U.S. Cl. ........................ 366/83; 425/204
(58) Field of Classification Search ............... 366/83, 366/293–296; 425/204
    See application file for complete search history.

(56) References Cited

U.S. PATENT DOCUMENTS 2,653,351 A * 9/1953 Henning .................. 425/204
2,948,922 A    8/1960 Meskat et al.
3,583,684 A    6/1971 Schippers
4,802,140 A *  1/1989 Dowling .................. 366/79

FOREIGN PATENT DOCUMENTS

| DE | 2 306 665 | 8/1974 |
| FR | 1 270 314 | 8/1961 |
| SU | 1 498 623 | 8/1989 |
| WO | WO2005/087477 | 9/2005 |

* cited by examiner

*Primary Examiner*—David L Sorkin
(74) *Attorney, Agent, or Firm*—Buchanan Ingersoll & Rooney

(57) ABSTRACT

A viscoelastic material is extruded by kneading-and-conveying screws of different respective diameters positioned coaxially and telescopingly. A flight trough of a larger-diameter screw has radial orifices allowing a first space swept by the flight of the larger-diameter screw to communicate with a second space swept by a flight of a smaller-diameter screw. A fixed cylindrical tube arranged coaxially with the screws is disposed radially between the first and second spaces within the region in which the screws telescope. The tube has radial apertures therethrough to conduct material from the orifices to the second space. The first space is closed off at an axial end thereof by a wall where foreign substances accumulate that do not pass through the orifices. A passage through the wall can be opened to remove the accumulated substances without interrupting the extrusion operation.

15 Claims, 2 Drawing Sheets

METHOD AND DEVICE FOR HOMOGENIZING AND FILTERING A VISCOELASTIC MATERIAL USING COAXIAL TELESCOPING SCREWS

The present application claims priority under 35 U.S.C. §119 and/or §365 to Patent Application Serial No. 06/08124 filed in France on Sep. 14, 2006, the entire content of which is incorporated herein.

BACKGROUND

The invention relates to the field of the extrusion of plastic or viscoelastic materials and, in particular, to the field of the extrusion of rubbery materials.

Industrial use of these materials, before they are shaped by injection moulding or by feeding them through a die, requires these materials to be homogenized as fully as possible both in terms of temperature and in terms of viscosity so as to gain control over the mechanical properties of the end-product.

Conventional extrusion methods for ensuring these functionalities comprise a screw in which the shape of the flight is designed to cause the material to circulate, while breaking up and recombining the streams. They may comprise a filter screen pack positioned downstream of the stream, so as to remove undesirable foreign substances.

These methods are generally very penalizing in terms of the flow rate and temperature performance of the extrusion means, because of the high pressure drops they cause. This penalty is all the worse if a filter system is added, because the build-up of substances may block the filters, making operation more difficult.

Already known in the prior art is an extrusion device comprising two or more kneading and conveying screws positioned coaxially and concentrically with respect to one another in the same body, in which the flight trough of a larger-diameter screw has orifices allowing the space swept by the flight of the larger-diameter screw to communicate with the space swept by the flight of the immediately adjacent smaller-diameter screw. This type of device is described by way of example in patent FR 1 270 314 or alternatively in patent FR 2 008 656 (corresponding to Schippers U.S. Pat. No. 3,583,684).

Such devices are able to achieve a certain level of homogenization but are restricted in this action in as much as the material passes directly from the space swept by the flight of the larger-diameter screw into the space swept by the flight of the immediately adjacent smaller-diameter screw. Furthermore, because of this type of layout, the screws have to turn at different speeds from one another so as to provide the work necessary for transferring the material. This leads to complex mechanical layouts, particularly when it is desirable to produce a device comprising more than two concentric screws.

Also known, from publications Meskat et al. U.S. Pat. No. 2,948,922 or SU 1 498 623, are a device and a method in which a larger diameter screw and a smaller diameter screw are arranged coaxially and telescopingly. The flight trough of the larger diameter screw has orifices which open into a space disposed radially between the telescoping screw portions. A fixed cylindrical apertured tube is interposed between a space swept by the flight of the smaller-diameter screw and said space into which the orifices open. However, these devices have the disadvantage of not easily allowing substances larger in size than the orifices made in the cylindrical tube to be removed without the need to shut the device down in order to carry out an operation of emptying and unclogging the filter.

SUMMARY OF PREFERRED EMBODIMENT

The device according to the invention, which is intended for extruding and filtering a viscoelastic material, is designed to overcome this disadvantage. This device preferably comprises kneading-and-conveying screws positioned coaxially and concentrically in a body, in which the flight trough of a larger-diameter screw has orifices allowing the space swept by the flight of the larger-diameter screw to communicate with the space swept by the flight of the smaller-diameter screw.

A fixed cylindrical tube comprising apertures passing through the wall of the cylindrical tube is inserted between the space swept by the flight of the smaller-diameter screw and the space into which the orifices open. The space swept by the flight of the larger-diameter screw is closed off by a wall so that when the device is operating, the material is forced into the orifices and then into the apertures. The wall has an orifice communicating with an outfall closed off by a removable blanking means.

The cylindrical tube acts as a filter plate, the size of the apertures of which need to be calibrated such as to set the size of the particles of material that are to be filtered out.

Acting in this way makes it possible for substances with a diameter greater than the size of the orifices to be concentrated at the end of the space swept by the flight of the larger-diameter screw and communicating with the outfall. All that is then required is for the outfall to be opened so that the end region can be emptied and the undesirable particles expelled without the need to interrupt the operation of the machine.

Acting in this way also makes it possible to improve the homogenization of the material. This is because the stream is split for a first time as it passes through the orifices, and is then split a second time as it enters the apertures made in the cylindrical tube, before being carried along by the flight of the smaller-diameter screw.

In addition, the material undergoes significant shear as it passes between the various components because of the relative movements of these components with respect to one another.

It is also found that this capacity for homogenization, for mechanical work and for filtration is obtained with a pressure drop that is relatively limited because of the low magnitude of the distances, known as passive distances, over which the material is displaced solely under the action of the pressure obtaining upstream. This passive distance is formed, to a first approximation, by the length of the orifices passing through the flight trough of the larger-diameter screw and by the thickness of the cylindrical tube. This small amount of pressure drop has the effect of limiting the increase in the temperature of the material.

Finally, bearing in mind the fact that the cylindrical tube is not rotationally driven, the cylindrical tube acts as the internal wall of the body of an extruder. It is therefore possible for the screws to be rotated at the same rotational speed, allowing these components to be secured to one another, and driven using a common mechanical device. The layout and construction of such a system are therefore greatly simplified by this, by comparison with the layout and construction of known systems.

BRIEF DESCRIPTION OF DRAWINGS

The description which follows will reveal the other advantages of a method and a device for homogenizing and filtering according to the invention.

DETAILED DESCRIPTION OF PREFERRED EMBODIMENTS

Figure 1:
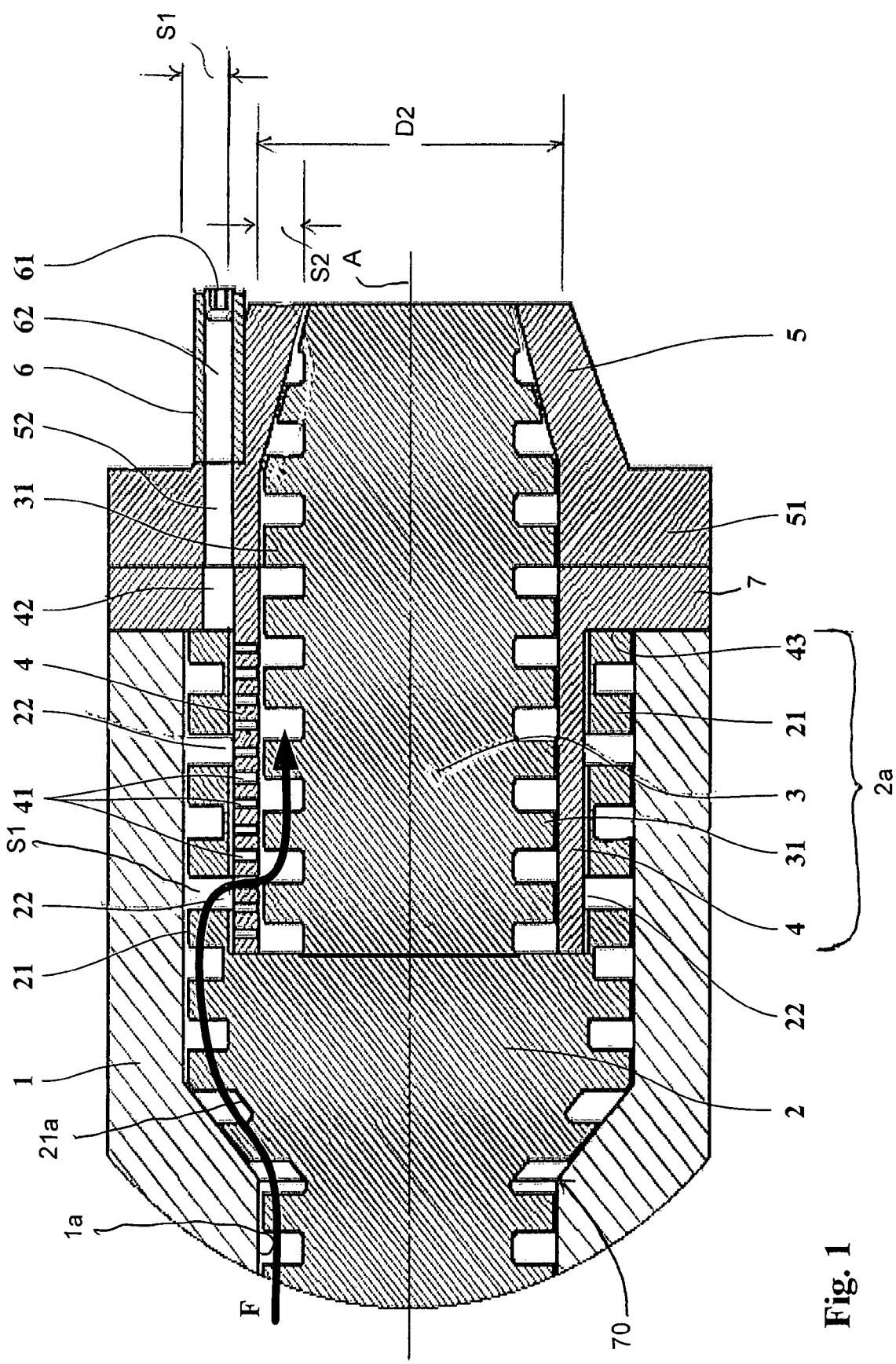
FIG. 1 depicts a schematic longitudinally sectioned view of the preferred embodiment.

The device illustrated in FIG. 1 comprises an extruder body 1 mounted on a chassis (not depicted). A screw 2 comprising a core and a helical flight 21 projecting from the core is rotationally driven about an axis A by a conventional drive assembly (not depicted). A conventional feed system (not depicted) positioned upstream introduces the viscoelastic material into the device. The shape of the flight 21, here depicted schematically, is tailored to the flow rate and temperature that are to be obtained at the outlet of the device, using methods known to those skilled in the art.

When the device is operating, the stream of material flows in the direction of the arrow F within an internal space S1 swept by the helical flight 21 of the screw 2, i.e., a space S1 situated between the interior wall 1a of the body 1 of the extruder and the floor of the trough 21a of the screw flight 21. This space S1 is closed off at its axial downstream end by a wall 43 which enables the stream of material to be forced through radial orifices 22 made in the floor of the trough of the flight 21. The wall 43 is part of a sleeve 7 mounted in such a way as to be stationary with respect to the body 1.

The portion of the flight trough 21 situated in the downstream part of the screw 2 has orifices 22 which fluidly interconnect the space S1 with an internal space formed within a hollow section 2a of the core of the screw 2.

The result of this is that the stream F is forced, under the effect of the feeding pressure, through the orifices 22 and towards the internal space formed by the radially inner surface of the core's hollow section 2a.

Telescopingly or concentrically arranged within the hollow section 2a of the core is an end of a screw 3, of smaller diameter than the screw 2, the axis of rotation of which coincides with the axis of rotation of the larger-diameter screw 2. Disposed radially opposite the orifices 22 is a space S2 swept by the flight 31 of the smaller-diameter screw 3. The space S2 has an outer diameter D2 which is less than the inside diameter of the hollow core section 2a of the larger diameter screw 2.

The device is supplemented by a head 5, removably secured to the body 1 and situated in the downstream part of the device. The body 1, the sleeve 7 and the head 5 together define a housing.

A fixed cylindrical tube portion 4, which is integral with the sleeve 7, is inserted radially between the space S2 swept by the flight 31 of the smaller-diameter screw 3 and the space of the hollow core section 2a into which the orifices 22 open. This cylindrical tube has apertures 41 passing radially therethrough such that the stream F is directed from the orifices 22 through the apertures 41 so that it can be taken up by the flights 31 of the smaller-diameter screw 3 which mix the material once again and direct it towards the outlet of the device. The apertures 41 are spaced apart along the telescoping zone of the screws 2, 3 which coincides with the hollow section 2a of the core of the screw 2.

As has already been stated above, these multiple fragmentations of the stream F via the orifices 22 and the apertures 41 have the effect of improving the homogenization effect without causing the material to be heated significantly. The path from the screw 2 to the screw 3, termed the passive path, during which the material is propelled under the sole effect of the pressure generated by the larger-diameter screw, may be extremely short and be reduced essentially to the thickness of the cylindrical tube, which thickness may range between 1 and 10 mm.

Efforts will also be made to minimize the thickness of the cylindrical tube 4 in order to make it easier to empty out the device before a shut-down phase, so as to minimize the amount of material remaining in the device.

The apertures 41 made in the cylindrical tube may be of extremely variable size and shape according to whether it is desirable simply to homogenize or to filter the material.

Figure 2:
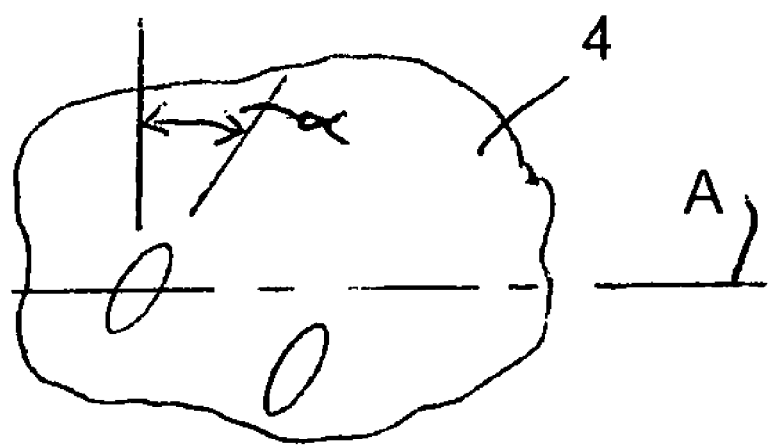
FIG. 2 is a fragmentary view of the cylindrical tube, showing slot-shaped apertures therein.

On the other hand, when the device is used as a homogenizer, the shape of the apertures 41 is designed to separate the streams of material passing through the flight 21 of the larger-diameter screw as effectively as possible. A slot shape for the apertures 41, as shown in FIG. 2, appears to afford the best efficiency, and the angle $\alpha$ that the slot makes with the direction of the generatrices of the cylindrical tube needs to be tailored to suit the rotational speed of the screws, the angle $\alpha$ ranging between 0° and 90° with respect to the direction of the generatrices of the cylindrical tube.

By sufficiently reducing the size of the apertures 41, the device then acts as a filter. The size of the apertures, which may advantageously adopt the shape of circular cylindrical holes, may be small, if care is also taken to increase the number of the apertures 41 so as not to penalize such a filter device by imposing too high a pressure drop.

Figure 3:
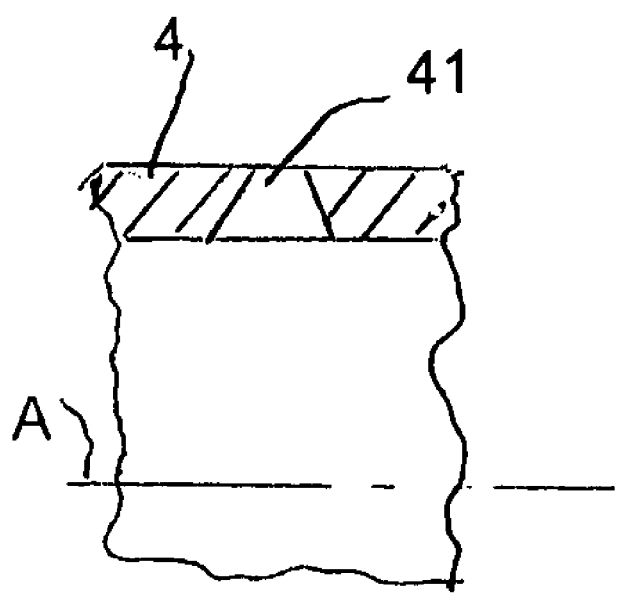
FIG. 3 is a fragmentary view of the cylindrical tube showing flared-shaped apertures.

In order to reduce the pressure drop across such filter, it is possible to give the walls of the apertures 41 a flared shape so that the cross section of the aperture increases in the direction in which the material progresses through the filter, as shown in FIG. 3. It is thus possible to hold the undesirable substances back, upstream of the filter, while at the same time encouraging the material to pass into the aperture.

This pressure drop may be further reduced by increasing the diameter of the larger-diameter screw 2 at the downstream transfer region, the increase in diameter being accomplished gradually, beginning at point 70 illustrated in FIG. 1. This measure makes it possible to increase the overall surface area of the filter with respect to the flow rate of the device.

The sleeve 7 is equipped with a duct 42 which passes through the wall 43 and continues in the region of the head 5 in the form of an outfall or outlet duct 52, which communicates with a discharge member 6 forming a duct 62 that is closed off by a removable closure or blanking element 61.

The particles unable to pass through the apertures 41 in the tube 4 are mechanically reduced by the movement of the internal part of the larger-diameter screw 2 around the cylindrical tube 4 until they are small enough in size to pass through an aperture 41. If the particle cannot be sufficiently reduced, it is instead pushed towards the downstream end of the tube in the direction of the wall 43 where such particles accumulate.

To discharge the particles while the device is operating, it is merely necessary for the blanking element 61 to be removed so that the space in which these contaminants have accumulated can be emptied, i.e., the accumulated particles are pushed out through a discharge passage formed by the ducts 42, 52, 62. This then prevents the apertures 41 made in the cylindrical tube 4 from becoming blocked, eliminating the need to interrupt the operation of the device in order to change or clean the filter.

In order to make it easier to assemble all the components, the sleeve 7 is removable. Thus, the cylindrical tube 4 can be removed simply by removing the extrusion head 5, e.g. by removing fastener screws (not shown) which secure the extrusion head 5 and the sleeve 7 to the body 1.

Another advantage of the device according to the invention is that it is possible to turn the screws 2, 3 at the same rotational speed. This is because each of the screw flights drives the material along in a translational movement with respect to a fixed wall. This effect is obtained by the flight 21 with respect to the interior wall of the body 1, and in the same way, by the flight 31 with respect to the interior wall of the cylindrical tube 4.

It is then easy to secure the screws 2, 3 to one another by positioning them concentrically and coaxially with respect to one another and interconnecting them, preferably in axial abutment with one another. Thus, only the larger-diameter screw 2 needs to be connected to a driving member, thereby greatly simplifying the production of the device.

It is also possible to produce an assembly comprising several successive stages by extending the head 5 of the body 1 and by making orifices in the downstream part of the screw 3 to allow the space swept by the flight 31 of the screw 3 to communicate with an internal space formed in the core of the screw 3 which would work in conjunction with a smaller-diameter screw (not depicted in FIG. 1).

This cascade of screws successively collaborating one with the next may also be produced in a very compact form by making the screws concentric (i.e., telescoping).

It is then possible to assign more specific functions to the various cylindrical tubes by devoting larger-diameter tubes 4 to filtration functions and smaller-diameter tubes 4 to homogenization functions or alternatively to size the orifices 22 in such a way as to filter out substances of increasingly small size.

Likewise, it is possible to vary the diameter of the various screws or, alternatively, to make the screws conical in shape. It may thus be readily appreciated that the diameter of the screw 3 can increase again downstream of that part of the device in which this screw collaborates with the screw 2.

Any number of the screws 2, 3 can be arranged axially along the extrusion path to provide a number of areas where the extruding material passes sequentially through a first space S1, orifices 22, apertures 41 and a second space S2.

The invention claimed is:

1. Apparatus for extruding a viscoelastic material, comprising kneading-and-conveying screws arranged substantially coaxially within a housing; one of the kneading-and-conveying screws being of smaller diameter than another of the kneading-and-conveying screws and extending telescopingly within such larger-diameter other screw along a telescoping region; a screw flight of the larger-diameter screw defining a trough whose floor has orifices extending therethrough to fluidly interconnect a first space swept by the screw flight of the larger-diameter screw with a second space swept by the screw flight of the smaller-diameter screw; a stationary cylindrical tube arranged substantially coaxially with, and radially between, the first and second spaces; the tube including apertures extending generally radially therethrough; the first space being axially closed-off by a wall at a downstream end thereof wherein material being conveyed by the larger-diameter screw is forced through the orifices and then through the apertures to enter the second space; the housing including a selectively openable passage communicating with the first space adjacent the wall to enable the removal of substances in the material that have not passed through the orifices and have accumulated at the wall.

2. Apparatus according to claim 1 wherein the passage extends through the wall.

3. Apparatus according to claim 2 wherein the passage extends substantially parallel to the axis of the screw.

4. Apparatus according to claim 1 wherein the wall is integral with the cylindrical tube.

5. Apparatus according to claim 1 wherein the cylindrical tube constitutes a removable part of the housing.

6. Apparatus according to claim 1 wherein the larger-diameter and smaller diameter screws include respective cores that are interconnected, wherein rotation of either of the screws is transmitted to the other.

7. Apparatus according to claim 6 wherein the respective cores are in axial abutment with one another.

8. Apparatus according to claim 1 wherein the apertures comprise circular cylindrical holes.

9. Apparatus according to claim 1, wherein the apertures are slot-shaped.

10. Apparatus according to claim 1 wherein the apertures are shaped such that their cross-section increases in a direction of material flow therethrough.

11. Apparatus according to claim 1 wherein the passage is arranged to discharge substances while the apparatus continues to operate.

12. Apparatus according to claim 1 wherein the passage is closable by a removable closure element situated at an end of the passage remote from the first space.

13. A method of extruding a viscoelastic material by the apparatus of claim 1, comprising the steps of:
   A) feeding the material to the larger diameter screw;
   B) rotating the larger diameter screw and the smaller diameter screw to cause the material to be conveyed along the first space, then sequentially through the orifices and the apertures and into the second space; and
   C) opening the passage during step B to enable the accumulated substances to be discharged as the apparatus operates.

14. Method according to claim 13 wherein the larger and smaller diameter screws are rotated at the same speed in step B.

15. Method according to claim 13 wherein the substances being discharged along the passage in step C pass through the wall.

* * * * *